United States Patent
Yahagi et al.

(10) Patent No.: US 11,833,622 B2
(45) Date of Patent: Dec. 5, 2023

(54) FLUX AND SOLDER PASTE

(71) Applicant: KOKI Company Limited, Tokyo (JP)

(72) Inventors: Takeshi Yahagi, Tokyo (JP); Noriyoshi Uchida, Tokyo (JP); Yuri Misumi, Tokyo (JP)

(73) Assignee: KOKI Company Limited, Tokyo (JP)

( * ) Notice: Subject to any disclaimer, the term of this patent is extended or adjusted under 35 U.S.C. 154(b) by 0 days.

(21) Appl. No.: 17/266,146

(22) PCT Filed: Jul. 24, 2019

(86) PCT No.: PCT/JP2019/028961
§ 371 (c)(1),
(2) Date: Feb. 5, 2021

(87) PCT Pub. No.: WO2020/031693
PCT Pub. Date: Feb. 13, 2020

(65) Prior Publication Data
US 2021/0291304 A1  Sep. 23, 2021

(30) Foreign Application Priority Data

Aug. 10, 2018 (JP) ................................ 2018-151648

(51) Int. Cl.
| | |
|---|---|
| *B23K 35/362* | (2006.01) |
| *B23K 35/02* | (2006.01) |
| *B23K 35/36* | (2006.01) |
| *B23K 103/08* | (2006.01) |
| *B23K 35/26* | (2006.01) |

(52) U.S. Cl.
CPC .......... *B23K 35/362* (2013.01); *B23K 35/025* (2013.01); *B23K 35/3613* (2013.01); *B23K 35/3618* (2013.01); *B23K 35/262* (2013.01); *B23K 2103/08* (2018.08)

(58) Field of Classification Search
CPC .................................................... B23K 35/362
See application file for complete search history.

(56) References Cited

U.S. PATENT DOCUMENTS

| | | | | |
|---|---|---|---|---|
| 2008/0073000 | A1* | 3/2008 | Ikeda | B23K 35/0244 148/24 |
| 2015/0102090 | A1* | 4/2015 | Arai | H05K 13/0465 148/23 |
| 2017/0190005 | A1 | 7/2017 | Uehata et al. | |
| 2019/0182966 | A1 | 6/2019 | Yamamoto et al. | |

FOREIGN PATENT DOCUMENTS

| | | | | |
|---|---|---|---|---|
| CN | 102489898 | | 6/2012 | |
| CN | 103402659 | | 11/2013 | |
| CN | 105051122 | A * | 11/2015 | ............... C08K 3/36 |
| CN | 103402659 | B * | 11/2016 | ............... B09B 3/00 |
| CN | 106132629 | | 11/2016 | |
| CN | 107160052 | | 9/2017 | |
| CN | 108136549 | | 6/2018 | |
| EP | 3335829 | | 6/2018 | |
| JP | 03-151189 | | 6/1991 | |
| JP | 05-185284 | | 7/1993 | |
| JP | 06-63788 | | 3/1994 | |
| JP | 07-132395 | | 5/1995 | |
| JP | 08-99189 | | 4/1996 | |
| JP | 08-174264 | | 7/1996 | |
| JP | 10-43882 | | 2/1998 | |
| JP | 2004-230426 | | 8/2004 | |
| JP | 2005-334895 | | 12/2005 | |
| JP | 2007-136491 | | 6/2007 | |
| JP | 2015-142936 | | 8/2015 | |
| JP | 2018-024023 | | 2/2018 | |
| WO | 2009/069601 | | 6/2009 | |
| WO | 2018/025903 | | 2/2018 | |
| WO | 2018/003820 | | 7/2018 | |
| WO | 2019/142802 | | 7/2019 | |

* cited by examiner

*Primary Examiner* — Anthony M Liang
(74) *Attorney, Agent, or Firm* — Clark & Brody LP

(57) ABSTRACT

A flux includes a solvent and a thixotropic agent, the solvent including a carboxylic acid that is liquid at ordinary temperature.

5 Claims, 1 Drawing Sheet

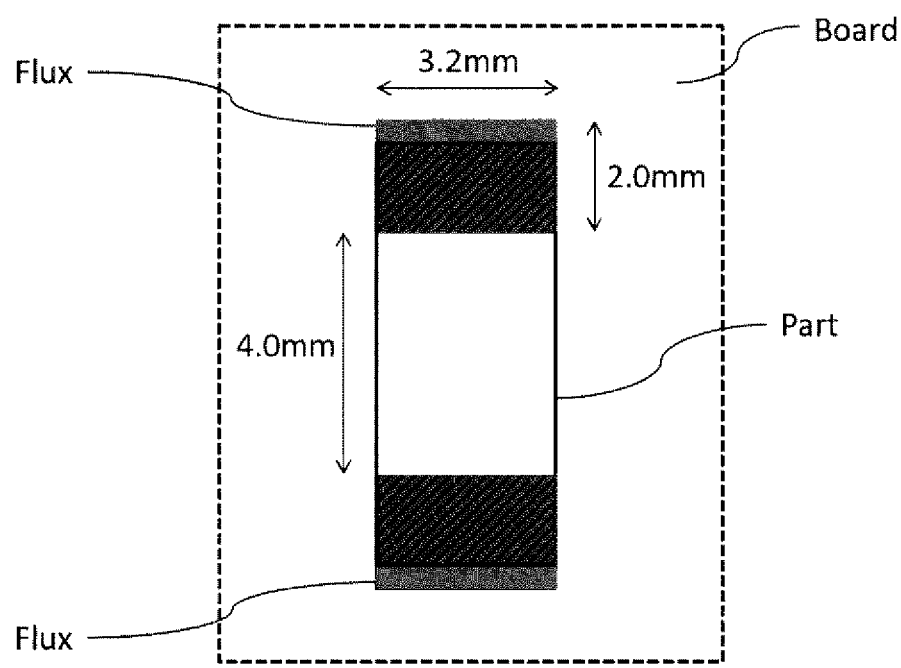

FLUX AND SOLDER PASTE

CROSS-REFERENCE TO RELATED APPLICATION

This application claims priority to Japanese Patent Application No. 2018-151648, the disclosure of which is incorporated herein by reference in its entirety.

FIELD

The present invention relates to a flux used for soldering, and a solder paste including the flux.

BACKGROUND

Examples of a solder composition used for joining electronic parts to an electronic circuit board such as a printed wiring board include a solder paste in which solder alloy powder and flux are mixed together. As the flux included in the solder paste, widely used is a resin-based flux including a natural resin such as rosin or a synthetic resin, an activator, a solvent, a thixotropic agent, or the like.

The flux includes, for example, an activator such as an organic acid, a halogen compound, or an amine compound in order to remove oxide films on solder surfaces, component electrodes, substrate pads, or the like. It is known that use of the flux including such an activator suppresses the occurrence of voids at solder joints and improves solder wettability (for example, Patent Literatures 1 to 3).

CITATION LIST

Patent Literature

Patent Literature 1: JP 2007-136491 A
Patent Literature 2: JP 2005-334895 A
Patent Literature 3: JP 2018-024023 A

SUMMARY

Technical Problem

In recent years, a more active flux has been demanded to suppress the occurrence of voids at solder joints and improve solder wettability even in the case where soldering is performed to parts composed of a material to which solder hardly adheres, parts used under severe temperature conditions (for example, on-vehicle electronic parts), or the like.

The present invention has been conceived in view of the above circumstances, and it is an object of the present invention to provide a flux capable of suppressing the occurrence of voids at solder joints and improving solder wettability more than before, and a solder paste including the flux.

Solution to Problem

Conventionally, known as a solvent is, for example, an ethylene glycol-based solvent, a propylene glycol-based solvent, a diol-based solvent, or the like. Since these solvents have no acid number, they usually have no capability as activators. The present inventors have found that use, as a solvent, of a carboxylic acid having a high acid number and being liquid at ordinary temperature causes the carboxylic acid to have capability also as an activator while being a solvent, and consequently the flux including, as the solvent, the carboxylic acid being liquid at ordinary temperature can suppress the occurrence of voids at solder joints and improve solder wettability more than before. The summary of the present invention is provided below.

A flux according to the present invention includes: a solvent; and a thixotropic agent, the solvent including a carboxylic acid that is liquid at ordinary temperature.

In the flux according to the present invention, it is preferable that the carboxylic acid have an acid number of 300 mgKOH/g or more.

In the flux according to the present invention, it is preferable that the carboxylic acid be a fatty acid having an alkyl chain having 6 to 10 carbon atoms.

In the flux according to the present invention, it is preferable that a content of the carboxylic acid be 2.0 to 70.0% by mass based on an entire flux.

The flux according to the present invention may further include 10% or less by mass of an organic acid-based activator based on the entire flux.

The flux according to the present invention may further include at least one of a rosin-based resin and a synthetic resin.

A solder paste according to the present invention includes the flux described above.

BRIEF DESCRIPTION OF DRAWINGS

FIG. 1 is a schematic view showing a position of a test board prepared in Examples at which a part is mounted.

DESCRIPTION OF EMBODIMENTS

Hereinafter, a flux and a solder paste including the flux according to an embodiment of the present invention will be described.

<Flux>

(Solvent)

The flux according to this embodiment includes, as a solvent, a carboxylic acid that is liquid at ordinary temperature. The ordinary temperature herein refers to 35° C.

Examples of the carboxylic acid that is liquid at ordinary temperature include acetic acid, propanoic acid, butanoic acid, pentanoic acid, hexanoic acid, heptanoic acid, octanoic acid, nonanoic acid, decanoic acid, 2-ethylhexanoic acid, 3,5,5-trimethylhexanoic acid, hexanoic anhydride, and dimer acid. Among these, a fatty acid having an alkyl chain having 6 to carbon atoms is preferable. The fatty acid having an alkyl chain may be a fatty acid having a linear alkyl group or a branched alkyl group. Examples of the fatty acid having an alkyl chain having 6 to 10 carbon atoms include hexanoic acid, heptanoic acid, octanoic acid, nonanoic acid, decanoic acid, 2-ethylhexanoic acid, and 3,5,5-trimethylhexanoic acid. Among these, hexanoic acid, heptanoic acid, or octanoic acid is preferable. These may be individually used, or two or more of them may be used in combination.

The acid number of the carboxylic acid is preferably 300 mgKOH/g or more, more preferably 350 mgKOH/g or more. Further, the acid number is preferably 550 mgKOH/g or less, more preferably 500 mgKOH/g, or less. Here, the add number represents the number in mg of potassium hydroxide required to neutralize the acidic component included per 1 g of sample, and can be measured according to JIS-K0070.

The content of the carboxylic acid is preferably 2.0 to 70.0% by mass based on the entire flux. Further, the content is more preferably 10.0% or more by mass, and more preferably 50.0% or less by mass, based on the entire flux.

In the case where two or more carboxylic acids are included, the content means the total content of the carboxylic acids.

The flux according to this embodiment includes, as a solvent, the carboxylic acid that is liquid at ordinary temperature. Since it has a high acid number, the carboxylic acid has capability also as an activator while being a solvent. Thus, the flux can suppress the occurrence of voids at solder joints and improve solder wettability.

Also, the flux according to this embodiment in which the carboxylic acid has an add number of 300 mgKOH/g or more can further suppress the occurrence of voids at solder joints and further improve solder wettability.

Further, the flux according to this embodiment in which the carboxylic acid is a fatty acid having an alkyl chain having 6 to 10 carbon atoms can further suppress the occurrence of voids at solder joints and further improve solder wettability.

In addition, the flux according to this embodiment in which the content of the carboxylic acid is 2.0 to 70.0% by mass based on the entire flux can further suppress the occurrence of voids at solder joints and further improve solder wettability.

(Thixotropic Agent)

The flux according to this embodiment includes a thixotropic agent. The thixotropic agent is not particularly limited, and examples thereof include hardened castor oil, amides, kaolin, colloidal silica, organic bentonite, and glass frit. These may be individually used, or two or more of them may be used in combination.

The content of the thixotropic agent is not particularly limited, and is, for example, preferably 1% or more by mass, more preferably 2% or more by mass, still more preferably 3% or more by mass, based on the entire flux. Further, the content of the thixotropic agent is preferably 10% or less by mass, more preferably 6% or less by mass, still more preferably 5% or less by mass, based on the entire flux. In the case where two or more thixotropic agents are included, the content means the total content of the thixotropic agents.

(Resin)

The flux according to this embodiment may further include at least one of a rosin-based resin and a synthetic resin in terms of improving solder wettability. The rosin-based resin is not particularly limited, and examples thereof include gum rosin, tall oil rosin, wood rosin, polymerized rosin, hydrogenated rosin, disproportionated rosin, acrylated rosin, rosin ester, and acid modified rosin. The synthetic resin is not particularly limited, and a known synthetic resin can be used. Among these, it is preferably one or more selected from hydrogenated rosin, acid modified rosin, and rosin ester, in terms of activating the flux. These may be individually used, or two or more of them may be used in combination.

The total content of the rosin-based resin and the synthetic resin is not particularly limited, but is, for example, preferably 20 to 99% by mass, more preferably 30 to 99% by mass, based on the entire flux. In the case where one of the rosin-based resin and the synthetic resin is included, the content means the content of the one of the rosin-based resin and the synthetic resin.

(Organic Acid-Based Activator)

The flux according to the present embodiment includes no organic acid-based activator, or includes 2.5% or less by mass of an organic acid-based activator based on the entire flux. The organic acid-based activator is not particularly limited, and examples thereof include: a monocarboxylic acid such as lauric acid, myristic acid, pentadecylic acid, palmitic acid, margaric acid, stearic acid, tuberculostearic acid, arachidic acid, behenic acid, lignoceric acid, or glycolic acid; a dicarboxylic acid such as oxalic acid, malonic acid, succinic acid, glutaric acid, adipic acid, pimeric acid, suberic acid, azelaic acid, sebacic acid, fumaric acid, maleic acid, tartaric acid, and diglycolic acid; and other organic acids such as dimer acid, levulinic acid, lactic acid, acrylic acid, benzoic acid, salicylic acid, anisic acid, citric acid, and picolinic acid. These may be individually used, or two or more of them may be used in combination.

In the case where the flux includes an organic acid-based activator, the content of the organic acid-based activator is preferably 10% or less by mass and 2.5% or less by mass based on the entire flux, in terms of reducing flux residues. The content of the organic acid-based activator is preferably 0.1% or more by mass, more preferably 0.5% or more by mass, based on the entire flux, in terms of suppressing the occurrence of voids at solder joints and improving solder wettability. In the case where two or more organic acid-based activators are included, the content means the total content of the organic acid-based activators.

The flux according to this embodiment may include, for example, other solvent other than the carboxylic acid that is liquid at ordinary temperature, an antioxidant, a surfactant, a defoamer, and a corrosion inhibitor, as other additives.

The other solvent is not particularly limited, and a known solvent can be used. Examples of the solvent include glycol ethers such as diethylene glycol monohexyl ether (hexyl diglycol), diethylene glycol dibutyl ether (dibutyl diglycol), diethylene glycol mono 2-ethylhexyl ether (2 ethylhexyl diglycol), and diethylene glycol monobutyl ether (butyl diglycol); aliphatic compounds such as n-hexane, isohexane, and n-heptane; esters such as isopropyl acetate, methyl propionate, ethyl propionate, 2-ethylhexyl diglycol, and hexyl hexanoate; ketones such as methyl ethyl ketone, methyl-n-propyl ketone, and diethyl ketone; and alcohols such as ethanol, n-propanol, isopropanol, and isobutanol. These may be individually used, or two or more of them may be used in combination.

The content of the other solvent is not particularly limited, and is, for example, preferably 10% or more by mass, more preferably 20% or more by mass, based on the entire flux. The content of the other solvent is preferably 60% or less by mass, more preferably 50% or less by mass, based on the entire flux. In the case where two or more of the other solvents are included, the content means the total content of the other solvents.

A method for producing the flux according to this embodiment is not particularly limited. For example, a carboxylic acid that serves as a solvent and is liquid at ordinary temperature, a thixotropic agent, and other additives as appropriate are put into a heating container, followed by heating all these raw materials to 160 to 180° C. to melt them. They are finally cooled to room temperature to be thereby able to obtain the flux according to this embodiment.

<Solder Paste>

The solder paste according to this embodiment includes the aforementioned flux. More specifically, the solder paste is obtained by mixing solder alloy powder and the flux. The content of the flux is preferably 5 to 20% by mass based on the entire solder paste. The content of the solder alloy powder is preferably 80 to 95 mass % based on the entire solder paste.

A solder alloy in the solder alloy powder is not particularly limited, and examples thereof include a lead-free solder alloy and a lead solder alloy. In terms of reducing the environmental load, a lead-free solder alloy is preferable. Examples of the lead-free solder alloy include an alloy including tin, silver, copper, indium, zinc, bismuth, antimony, or the like. More specifically, they include alloys of Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, In/Ag, or the like.

The solder paste according to this embodiment includes the aforementioned flux, and thus can more suppress the occurrence of voids at solder joints and more improve solder wettability than before.

EXAMPLES

Hereinafter, examples of the present invention will be described. However, the present invention is not limited to the following examples.

[Preparation of Solder Paste]

Raw materials in mixing amounts shown in Tables 1 and 2 were put into a heating container and heated to 180° C. to melt all the raw materials. Thereafter, they were cooled to room temperature to obtain uniformly dispersed fluxes. Each mixing amount shown in Tables 1 and 2 is equal to the content of each component included in a flux. Next, a mixture was made to include 11% by mass of each flux and 89% by mass of solder powder (Sn-3.0 wt %, Ag-0.5 wt %, Cu) to obtain a solder paste of each of Examples and Comparative Examples.

TABLE 1

| | | | Melting point (° C.) | Boiling point (° C.) | Acid number (mg/ KOH) | Example |  |  |  |  |  |  |  |  |  |
|---|---|---|---|---|---|---|---|---|---|---|---|---|---|---|---|
| | | | | | | 1 | 2 | 3 | 4 | 5 | 6 | 7 | 8 | 9 | 10 |
| Mixing amount (% by mass) | Resin | KE-604 | — | — | — | 41.0 | 41.0 | 41.0 | 41.0 | 41.0 | 41.0 | 41.0 | 41.0 | 41.0 | 41.0 |
| | | S-145 | — | — | — | 5.0 | 5.0 | 5.0 | 5.0 | 5.0 | 5.0 | 5.0 | 5.0 | 5.0 | 5.0 |
| | Thixotropic agent | SLIPACKS ZHH | — | — | — | 5.5 | 5.5 | 5.5 | 5.5 | 5.5 | 5.5 | 5.5 | 5.5 | 5.5 | 5.5 |
| | | VA-79 | — | — | — | — | — | — | — | — | — | — | — | — | — |
| | | GEL ALL MD | — | — | — | — | — | — | — | — | — | — | — | — | — |
| | Organic acid-based activator | Azelaic acid | — | — | — | 2.0 | 2.0 | 2.0 | 2.0 | 2.0 | 2.0 | 2.0 | 2.0 | 2.0 | 2.0 |
| | | DBBD | — | — | — | 0.5 | 0.5 | 0.5 | 0.5 | 0.5 | 0.5 | 0.5 | 0.5 | 0.5 | 0.5 |
| Solvent | Liquid carboxylic acid | Hexanoic acid | −3 | 205 | 483 | 46.0 | 20.0 | 10.0 | 2.0 | — | — | — | — | — | — |
| | | Heptanoic acid | −10.5 | 223 | 431 | — | — | — | — | 46.0 | — | — | — | — | — |
| | | Octanoic acid | 16 | 238 | 389 | — | — | — | — | — | 46.0 | — | — | — | — |
| | | Nonanoic acid | 9 | 254 | 355 | — | — | — | — | — | — | 46.0 | — | — | — |
| | | Decanoic acid | 31 | 270 | 326 | — | — | — | — | — | — | — | 46.0 | — | — |
| | | 2-ethylhexanoic acid | −59 | 228 | 389 | — | — | — | — | — | — | — | — | 46.0 | — |
| | | 3,5,5-trimethyl-hexanoic acid | −70 | 241 | 355 | — | — | — | — | — | — | — | — | — | 46.0 |
| | | Hexanolo anhydride | −40 | 244 | 524 | — | — | — | — | — | — | — | — | — | — |
| | | Acetic acid | 16 | 118 | 934 | — | — | — | — | — | — | — | — | — | — |
| | Others | EHDG | — | — | 0 | — | 26.0 | 36.0 | 44.0 | — | — | — | — | — | — |
| | | Hexyl hexanoate | — | — | 0 | — | — | — | — | — | — | — | — | — | — |
| Evaluation results | Void properties | Void ratio (%) | | | | 1.2 | 12.3 | 12.4 | 11.7 | 17.3 | 8.9 | 11.3 | 18.4 | 14.3 | 12.5 |
| | | Judgment (○: Good, X: Poor) | | | | ○ | ○ | ○ | ○ | ○ | ○ | ○ | ○ | ○ | ○ |
| | Solder wettability | Wet spreading ratio (%) | | | | 91.0 | 95.1 | 95.2 | 85.0 | 97.4 | 93.4 | 97.3 | 97.5 | 98.9 | 94.7 |
| | | Judgment (○: Good, X: Poor) | | | | ○ | ○ | ○ | ○ | ○ | ○ | ○ | ○ | ○ | ○ |

TABLE 2

| | | | Melting point (° C.) | Boiling point (° C.) | Acid number (mg/ KOH) | Example |  |  |  |  |  | C. Example |  |
|---|---|---|---|---|---|---|---|---|---|---|---|---|---|
| | | | | | | 11 | 12 | 14 | 15 | 16 | 17 | 1 | 2 |
| Mixing amount (% by mass) | Resin | KE-604 | — | — | — | 41.0 | 41.0 | 43.5 | 41.0 | 43.5 | — | 41.0 | 41.0 |
| | | S-145 | — | — | — | 5.0 | 5.0 | 5.0 | 5.0 | 5.0 | — | 5.0 | 5.0 |
| | Thixotropic agent | SLIPACKS ZHH | — | — | — | 5.5 | 5.5 | 5.5 | — | — | — | 5.5 | 5.5 |
| | | VA-79 | — | — | — | — | — | — | — | 5.5 | — | — | — |
| | | GEL ALL MD | — | — | — | — | — | — | 3.0 | — | — | — | — |
| | Organic acid-based activator | Azelaic acid | — | — | — | 2.0 | 2.0 | — | 2.0 | 2.0 | 25.0 | 2.0 | 2.0 |
| | | DBBD | — | — | — | 0.5 | 0.5 | — | 0.5 | 0.5 | 5.0 | 0.5 | 0.5 |
| Solvent | Liquid carboxylic acid | Hexanoic acid | −3 | 205 | 483 | — | — | — | — | — | — | — | — |
| | | Heptanoic acid | −10.5 | 223 | 431 | — | — | — | — | — | — | — | — |
| | | Octanoic acid | 16 | 238 | 389 | — | — | 46.0 | 46.0 | 46.0 | 70.0 | — | — |
| | | Nonanoic acid | 9 | 254 | 355 | — | — | — | — | — | — | — | — |
| | | Decanoic acid | 31 | 270 | 326 | — | — | — | — | — | — | — | — |

TABLE 2-continued

| | | | Melting point (° C.) | Boiling point (° C.) | Acid number (mg/ KOH) | Example 11 | Example 12 | Example 14 | Example 15 | Example 16 | Example 17 | C. Example 1 | C. Example 2 |
|---|---|---|---|---|---|---|---|---|---|---|---|---|---|
| | | 2-ethylhexanoic acid | −59 | 228 | 389 | — | — | — | — | — | — | — | — |
| | | 3,5,5-trimethyl-hexanoic acid | −70 | 241 | 355 | — | — | — | — | — | — | — | — |
| | | Hexanolo anhydride | −40 | 244 | 524 | 46.0 | — | — | — | — | — | — | — |
| | | Acetic acid | 16 | 118 | 934 | — | 46.0 | — | — | — | — | — | — |
| | Others | EHDG | — | — | 0 | — | — | — | — | — | — | 46.0 | — |
| | | Hexyl hexanoate | — | — | 0 | — | — | — | — | — | — | — | 46.0 |
| Evaluation results | Void properties | Void ratio (%) | | | | 4.5 | 4.7 | 9.5 | 14.4 | 5.2 | 1.6 | 26.8 | 24.9 |
| | | Judgment (○: Good, X: Poor) | | | | ○ | ○ | ○ | ○ | ○ | ○ | X | X |
| | Solder wettability | Wet spreading ratio (%) | | | | 94.0 | 85.0 | 87.1 | 93.5 | 92.6 | 81.9 | 59.0 | 59.4 |
| | | Judgment (○: Good, X: Poor) | | | | ○ | ○ | ○ | ○ | ○ | ○ | X | X |

Details of each of the raw materials shown in Tables 1 and 2 are shown below.

KE-604: Acid modified rosin, product name "KE-604" manufactured by ARAKAWA CHEMICAL INDUSTRIES, LTD.

S-145: Terpene phenolic resin, product name "YS POLYSTER 5145" manufactured by YASUHARA CHEMICAL CO., LTD.

SLIPACKS ZHH: Hexamethylene hydroxystearine acid amide manufactured by Nihon Kasei CO., LTD.

VA-79: Higher fatty acid amide, product name "TALEN VA-79" manufactured by KYOSEISHA CHEMICAL Co., Ltd.

GEL ALL MD: Manufactured by New Japan Chemical Co., Ltd.

Azelaic acid: Manufactured by Tokyo Chemical Industry Co., Ltd.

DBBD: Trans-2,3-dibromo-2-butene-1,4-diol manufactured by Tokyo Chemical Industry Co., Ltd.

Hexanoic acid: Manufactured by Tokyo Chemical Industry Co., Ltd.

Heptanoic acid: Manufactured by Tokyo Chemical Industry Co., Ltd.

Octanoic acid: Manufactured by Tokyo Chemical Industry Co., Ltd.

Nonanoic acid: Manufactured by Tokyo Chemical Industry Co., Ltd.

Decanoic acid: Manufactured by Tokyo Chemical Industry Co., Ltd.

2-ethylhexanoic acid: Manufactured by Tokyo Chemical Industry Co., Ltd.

3,5,5-trimethylhexanoic acid: Manufactured by Tokyo Chemical Industry Co., Ltd.

Hexanoic anhydride: Manufactured by Tokyo Chemical Industry Co., Ltd.

Acetic acid: Manufactured by Tokyo Chemical Industry Co., Ltd.

EHDG: 2-ethylhexyl diglycol manufactured by Nippon Nyukazai Co., Ltd.

Hexyl hexanoate: Manufactured by Tokyo Chemical Industry Co., Ltd.

[Evaluation of Void Properties]
<Preparation of Test Board>

A board surface of a copper-clad laminate (size: 100 mm×100 mm, thickness: 1.6 mm) was subjected to treatment with a heat resistant pre-flux (product name: GLI-COAT-SMD F2, manufactured by SHIKOKU CHEMICALS CORPORATION), and then each of the solder pastes of Examples and Comparative Examples was applied to the board surface. The solder paste applied had a size of 7.1 mm×5.6 mm with a thickness of 120 μm. Next, a part (power transistor, TO-252, Sn-plated) was mounted at a position of the board surface at which the solder paste had been applied. Thereafter, heating was performed under the following temperature conditions to prepare a test board of each of Examples and Comparative Examples.

(Temperature Conditions)

Heating rate: 3.0° C./sec

Peak temperature: 30 seconds at 220° C. and higher

<Calculation of Void Ratio>

A radiograph photo of the position of each test board at which the part had been mounted was taken. As a radiographing apparatus, TUX-3100 (manufactured by MARS TOHKEN SOLUTION CO. LTD.) was used, and the radiographing conditions were a tube voltage of 75.0 V, a tube current of 100.0 μA, a filament current of 3.130 A, and a magnification of 10.9 times. Next, the taken radiograph photo was binarized to calculate the void ratio of a solder joint. The void ratio was judged to be good when it was less than 20%. The results are shown in Tables 1 and 2.

[Wettability Evaluation]
<Preparation of Test Board>

A board surface of a copper-clad laminate (size: 100 mm×100 mm, thickness: 1.6 mm) was subjected to treatment with a heat resistant pre-flux (product name: GLI-COAT-SMD F2, manufactured by SHIKOKU CHEMICALS CORPORATION), and then each of the solder pastes of Examples and Comparative Examples was applied to two different positions on the board surface. The two portions of the solder paste applied had rectangular shapes respectively having a size of 3.2 mm×2.0 mm and a thickness of 120 μm. A distance between the two different positions to which the solder paste had been applied was 4.0 mm in a direction perpendicular to the longitudinal direction of the positions. Next, a part (6330 chip resistor, Sn-plated) was mounted between the two different positions to which the solder paste had been applied so as to bridge the positions. Thereafter, heating was performed under the same temperature conditions as those for the evaluation of void properties to prepare a test board of each of Examples and Comparative Examples. FIG. 1 schematically shows the position of the prepared test board at which the part is mounted.

<Evaluation of Solder Wettability>

A radiograph photo of the position of each test board at which the part had been mounted was taken. The radiographing apparatus and conditions were the same as those for the evaluation of void properties. Next, the taken radiograph was binarized to calculate the wet spreading ratio of the solder paste at the positions at which the solder paste and the part overlapped each other (i.e., the shaded areas shown in FIG. 1). The wet spreading ratio was judged to be good when it was 80% or more. The results are shown in Tables 1 and 2.

As can be seen from the results of Tables 1 and 2, the test boards of Examples meeting all the requirements of the present invention can suppress the occurrence of voids at solder joints and improve solder wettability.

On the other hand, it can be seen that the test boards of Comparative Examples 1 and 2 not including the carboxylic acid that is liquid at ordinary temperature each have a high void ratio at solder joints and are poor in solder wettability.

The invention claimed is:

1. A flux comprising:
    a solvent; and
    a thixotropic agent,
    the solvent comprising a carboxylic acid that is liquid at ordinary temperature, wherein a content of the carboxylic acid is 20.0 to 70.0% by mass based on an entirety of the flux and the flux further comprises 0.1% or more and 10% or less by mass of an organic acid-based activator based on an entirety of the flux, and
    the carboxylic acid has an acid number of 355 mgKOH/g or more.

2. The flux according to claim 1, wherein
    the carboxylic acid is a fatty acid having an alkyl chain having 6 to 10 carbon atoms.

3. The flux according to claim 1, the flux further comprising:
    at least one of a rosin-based resin and a synthetic resin.

4. A solder paste comprising the flux according to claim 1.

5. The flux according to claim 2, the flux further comprising:
    at least one of a rosin-based resin and a synthetic resin.

* * * * *